A. C. SCHMIDT.
HANDLE FOR PERCOLATORS, &c.
APPLICATION FILED NOV. 24, 1920.
1,371,001.
Patented Mar. 8, 1921.
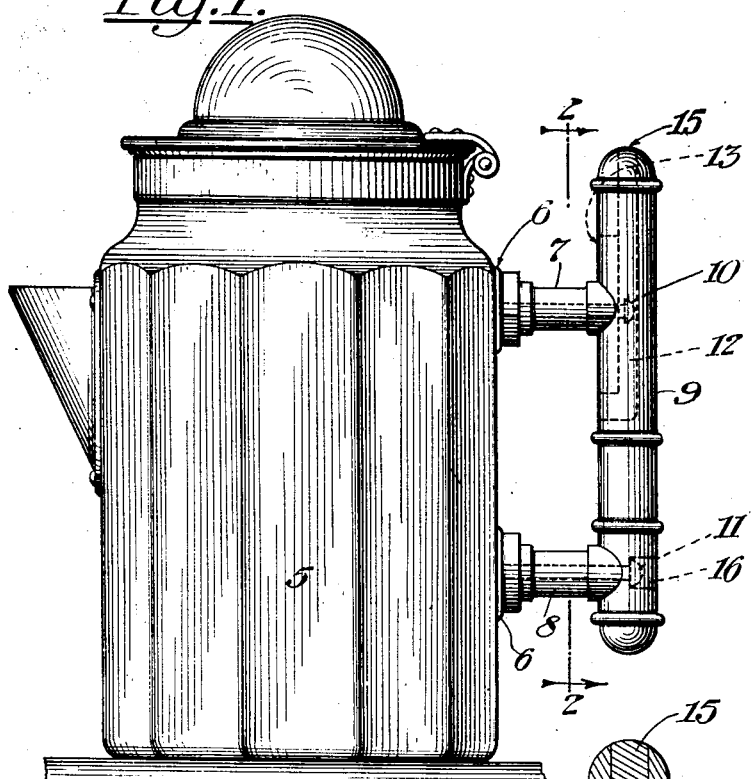
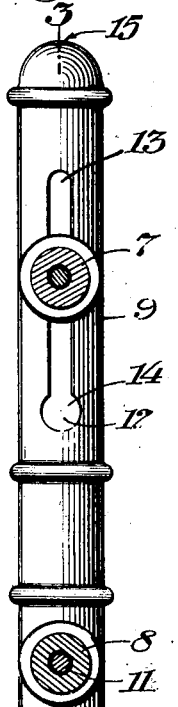
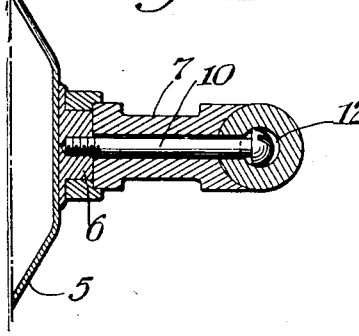
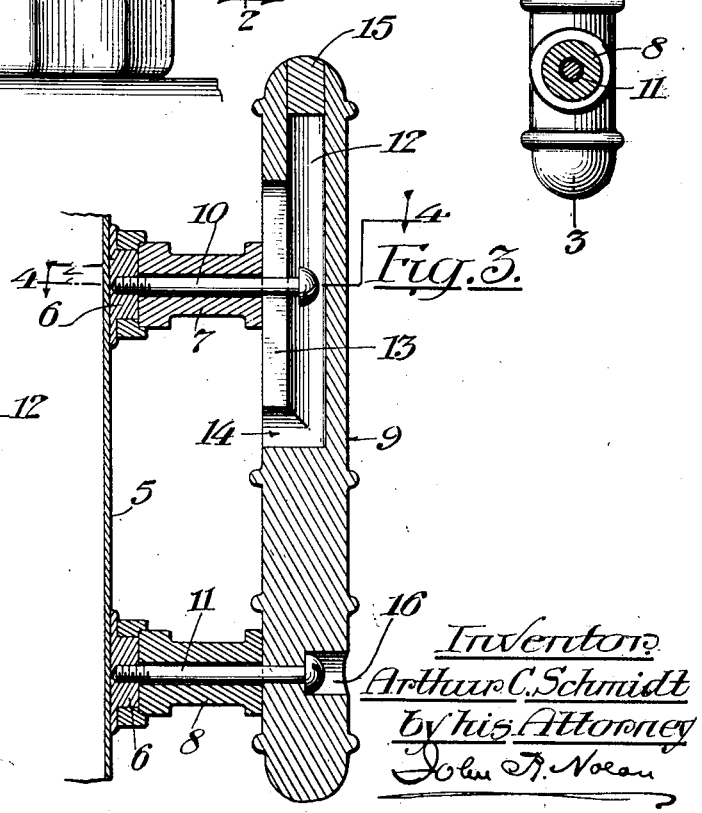
Inventor
Arthur C. Schmidt
by his Attorney
John T. Nolan

UNITED STATES PATENT OFFICE.

ARTHUR C. SCHMIDT, OF WEST NEW YORK, NEW JERSEY.

HANDLE FOR PERCOLATORS, &c.

1,371,001.

Specification of Letters Patent.   Patented Mar. 8, 1921.

Application filed November 24, 1920. Serial No. 426,170.

*To all whom it may concern:*

Be it known that I, ARTHUR C. SCHMIDT, a citizen of the United States, and resident of West New York, in the county of Hudson and State of New Jersey, have invented certain new and useful Improvements in Handles for Percolators, &c., of which the following is a specification.

This invention relates to handles for percolators and analogous vessels, and its object is to provide a handle of simple and efficient construction that can be readily applied to (or removed from) vessels of various sizes.

My invention has been particularly designed for use in connection with coffee percolators, or like vessels, wherein the handle proper is attached to two laterally-projecting supporting members positioned in spaced relation to each other, vertically, on one side of the body of the vessel, the distance between such members varying in vessels of different sizes or capacities.

According to my invention the handle in its preferred form comprises a body portion of such construction that it can be readily attached to, or removed from, the spaced-apart supporting members irrespective of varying distances between such members within relatively wide limits.

The invention also comprises structural features which will be hereinafter described and claimed.

In the drawings—

Figure 1 is an elevation of a percolator equipped with a handle embodying the principle of my invention.

Fig. 2 is a vertical section, enlarged, through the laterally projecting supports, on the line 2—2 of Fig. 1.

Fig. 3 is a similar section, on the line 3—3 of Fig. 2.

Fig. 4 is a transverse section through the handle proper, on the line 4—4 of Fig. 3.

Referring to the drawings, 5 designates the body of a coffee percolator, or other vessel, having two lateral bosses 6 fixed thereto in spaced relation to each other; 7, 8 designate two longitudinally perforated studs projecting from the bosses, and 9 designates a handle member which is secured to the outer ends of the bosses and away from the body of the vessel by means of screws 10, 11, respectively. These screws preferably extend entirely through the perforations of the studs and into the bosses so as to hold the studs as well as the handle member in place.

According to my invention a single interchangeable handle for vessels having differently separated handle supporting studs, or differently separated points of connection for said studs, is provided. The handle, in its preferred form, comprises an elongated body, preferably of wood, turned to any appropriate configuration, and having a longitudinally-extending locking key-way therein. This locking way comprises a channel 12 axially bored in one end of the body to a substantial extent—in the present instance, about one half of the length of the body,—one wall of which channel is cut away through a portion of its length to form a relatively narrow vertical slot 13, opening on one side of the handle body. The lower end of the slot is preferably enlarged, as at 14. The opening 14 and longitudinal channel 12 are proportioned to receive a locking piece which is conveniently provided by the projecting head of the upper screw 10, and the slot 13 is proportioned to embrace the shank of the screw. Hence the body can be readily applied to such locking piece and moved relatively thereto within the limits of the slot; or, in other words, the handle body can be slidably attached to the stud 7 from which the head of the screw 10 projects. Preferably the outer end of the channel 12 at the top of the handle body is closed by means of a plug, as 15. This body has formed therein, adjacent its lower end, a transverse countersunk hole 16 for the reception of the screw 11, which hole opens on the same side of the body as the slot 13 and is in vertical alinement with the slot, as shown.

In order to attach the handle above described to the vessel the upper stud 7 is attached to the upper boss by means of the screw 10, the head of the latter being left projecting somewhat outwardly beyond the stud. The opening 14 of the slot in the handle body is then applied to the projecting head of the screw until such head enters the channel 12, and the said body is then lowered sufficiently to cause the slot 13 to embrace the shank of the screw and thus retain the handle body slidably on the stud. The lower stud 8 is then applied to the handle body and in registry with the screw-hole 16, the screw 11 is passed through the handle body and the proximate stud, and the whole is bodily adjusted vertically until the screw is in registry with the screw-hole of the lower boss 6; whereupon the screw is tightened. The lower portion of the handle body is thus rigidly attached to the vessel, and the upper portion of such body is held in its adjusted position on the adjacent stud by the interlocking engagement of the upper screw head with the bored and slotted portion of the handle body. To remove the handle it is merely necessary to reverse the order of the operation above described.

By the foregoing construction it will be seen that a handle is provided which can be readily applied and affixed to, or removed from, various sized vessels in which the handle supporting members are differently spaced apart, as previously mentioned.

In case the studs are affixed to the body of the vessel independently of the handle body, the upper screw 10 is first applied to the adjacent stud, the slotted portion of the handle body is applied to the projecting head of such screw; the handle body is bodily adjusted longitudinally until the hole 16 is in registry with the perforation of the lower stud, and the lower screw 11 is finally applied to the said body and stud and tightened.

While the studs 7, 8 may be of wood, yet to prevent the burning of the lower stud, which is adjacent the fire, I prefer to make the latter stud of metal, such as aluminum.

It is to be understood that I do not limit my invention to the specific details of construction herein disclosed, as the same may be modified within the principle of the invention and the scope of the appended claims.

I claim—

1. In a handle adapted to fit vessels having handle-supporting members at different distances apart, the combination with said members, of a locking piece projecting from the outer end of one of the members, a handle body having therein a longitudinal key-way opening on one side of said body and adapted to be engaged with said locking piece, and means for fixedly connecting said body to the other one of said members, the said key-way and its opening extending throughout a substantial part of the length of the handle body for engagement by the locking pieces of differently spaced handle supporting members at a multiplicity of points in the handle and permitting extended longitudinal adjustment of the body on the locking piece in order to position said body in operative relation to the fixedly-connecting means irrespective of the distance apart, within limits, of said supporting members.

2. In a handle adapted to fit vessels having upper and lower handle-supporting members at different distances apart, the combination with said members, of a screw entered in the upper member and having its head projecting outward, a vertically-disposed handle body having a longitudinal key-way therein, and having a screw receiving aperture spaced below said key-way, and a screw for fixedly connecting said body to the lower supporting member by way of said aperture, the said key-way comprising a bore extending through a substantial part of the length of the body for engagement by the locking pieces of differently spaced handle supporting members at a multiplicity of points in the handle and having its wall cut away to form a relatively long narrow slot with an enlarged lower portion, whereby the said screw head can be slidably engaged with said locking piece and the handle body longitudinally adjusted to position its screw receiving aperture in operative relation to the lower member.

3. An adjustable handle of the character described comprising an elongated handle body having a longitudinal key-way therein, and having a screw receiving aperture spaced apart from said key-way, said key-way comprising a bore extending through a substantial part of the length of said body and having its wall cut away to form a relatively long narrow slot with an enlarged entrance portion.

Signed at West New York, in the county of Hudson and State of New Jersey, this 19th day of November, A. D. 1920.

ARTHUR C. SCHMIDT.